United States Patent [19]

Chetty et al.

[11] Patent Number: 4,542,440
[45] Date of Patent: Sep. 17, 1985

[54] SWITCH CURRENT SENSING WITH SNUBBER CURRENT SUPPRESSION IN A PUSH-PULL CONVERTER

[75] Inventors: P. R. K. Chetty, Germantown, Md.; John Dhyanchand; Pierre Thollot, both of Rockford, Ill.

[73] Assignee: Sundstrand Corporation, Rockford, Ill.

[21] Appl. No.: 548,141

[22] Filed: Nov. 2, 1983

[51] Int. Cl.[4] .............................................. H02H 7/12
[52] U.S. Cl. .................................. 361/111; 361/100; 363/55; 363/56; 363/41; 363/26; 363/24
[58] Field of Search ................. 361/110, 111, 91, 100; 363/41, 26, 24, 55, 56, DIG. 1

[56] References Cited

U.S. PATENT DOCUMENTS

| | | |
|---|---|---|
| 3,341,765 | 9/1967 | Rogers et al. |
| 3,913,000 | 10/1975 | Cardwell, Jr. ..................... 363/41 X |
| 4,002,963 | 1/1977 | Hunter ............................. 363/41 X |
| 4,245,288 | 1/1981 | McLyman. |
| 4,352,153 | 9/1982 | Voyer. |
| 4,410,935 | 10/1983 | Dang ................................. 363/56 X |

Primary Examiner—Patrick R. Salce
Attorney, Agent, or Firm—Wood, Dalton, Phillips, Mason & Rowe

[57] ABSTRACT

A push-pull converter has transistor power switches which conduct alternately to connect a DC source with the primary windings of an output transformer. A turn-off snubber circuit is connected with each power switch. When a power switch is turned on, snubber current pulses flow in the circuits connected with both switches. A switch current sensor circuit has a current transformer with an output winding inductively coupled with each of the conductors connected between the power switches and the primary windings of the output transformer. The snubber current pulses through the conductors are 180° out of phase and are suppressed in the current transformer output. The switch current signal from the secondary of the current transformer is free of snubber current pulses and is used in a flux balance circuit and in a pulse-by-pulse current limiter.

10 Claims, 7 Drawing Figures

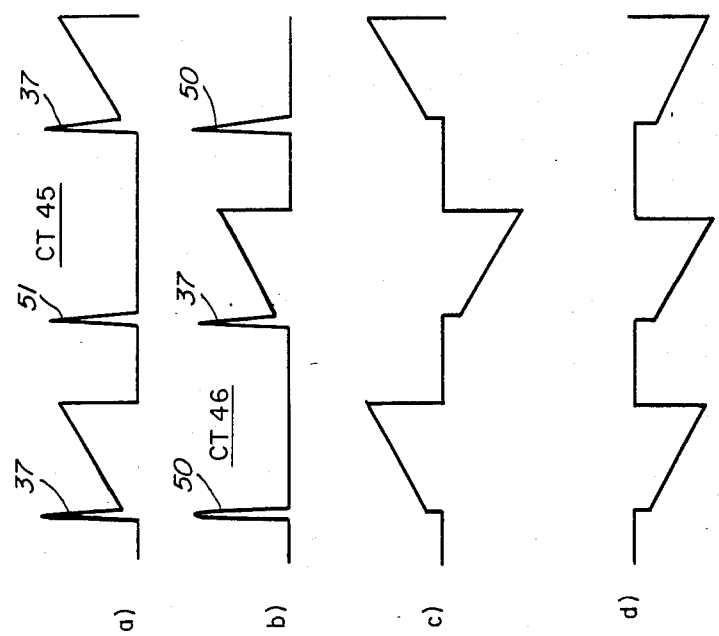
FIG. 6
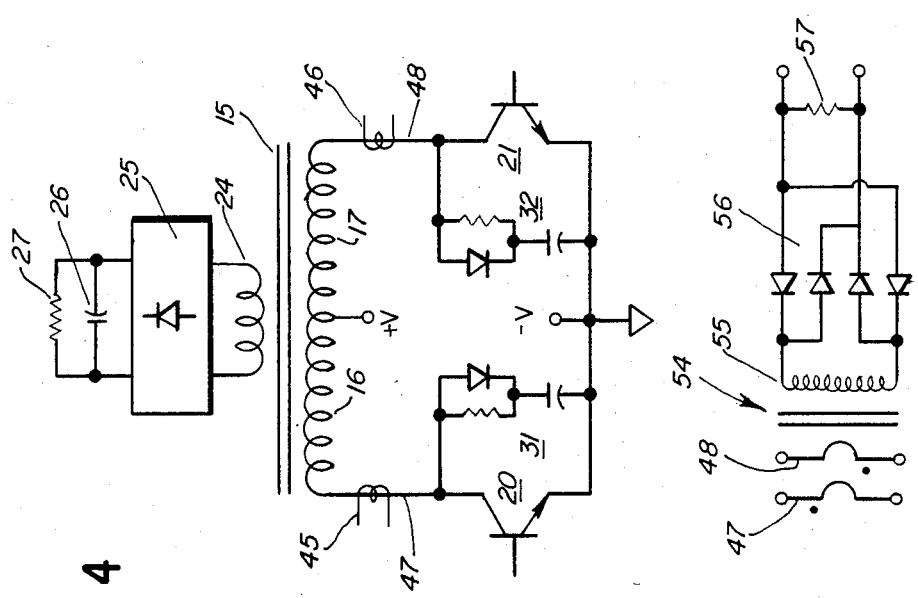
FIG. 4
FIG. 5

SWITCH CURRENT SENSING WITH SNUBBER CURRENT SUPPRESSION IN A PUSH-PULL CONVERTER

DESCRIPTION

1. Field of the Invention

This invention relates to a switch current sensor for a push-pull DC converter.

2. Background of the Invention

A push-pull DC converter typically has an output transformer with center tapped primary windings. Two power switches, as transistors, alternately connect each primary winding with a DC source. An alternating output is developed in the secondary winding of the converter and is rectified and filtered, providing DC output. The output voltage is connected with regulator or pulse width modulator (PWM) circuit which controls the conduction time of the power switches, thereby regulating the DC output voltage. Current sensing circuits responsive to the switching currents modify the operation of the pulse width modulator to maintain the currents within the operating limits of the power switches and to establish a balance of the current in the two switching circuits.

Various current sensors have been used. Resistor sensing is simple and direct, but is inefficient at high power levels and is noisy at high power and high switching frequencies. Current transformers have been used in high power, high frequency converters. Moreover, it is often necessary in high power converters to use turn-off snubber circuits to protect the power switches from the simultaneous occurrence of a high current and a high voltage. Typically, the turn-off snubber circuit may be the parallel combination of a diode and resistor connected in series with a capacitor, the combination being connected in parallel with the collector-emitter circuit of each power transistor. The snubber circuits cause snubber currents to flow in the power switches and in the primary windings of the output transformer. The snubber currents must be suppressed or masked in the output of the switch current sensing circuit to avoid malfunction of the converter regulator.

SUMMARY OF THE INVENTION

In accordance with the invention, the switch current sensor includes a current transformer having an output winding coupled with the circuits of both of the power switches, the current through one of the circuits being 180° out of phase with the current through the other circuit and the snubber current pulses being cancelled magnetically.

More particularly, one feature of the invention is that the switch current sensing circuit includes a current transformer having an output winding inductively coupled with each of the conductors which connect the power switches with the primary windings of the output transformer. The conductors are physically arranged so that switch currents through them are 180° out of phase, suppressing the snubber current pulses in the switch current signal induced in the output winding of the current transformer.

Another feature is that a full wave rectifier is connected with the secondary winding of the current transformer, providing a switch current signal to the converter regulator.

A further feature of the invention is the provision of means responsive to the switch current signal, for developing a flux balance input to the PWM converter.

And another feature of the invention is the provision of means responsive to the switch current signal providing a pulse-by-pulse current limiting input to the pulse width modulator for the converter.

Further features and advantages of the invention will readily be apparent from the following specification and from the drawings.

BRIEF DESCRIPTION OF THE DRAWINGS

FIG. 4 is a schematic diagram of a converter with current transformer sensing of the currents through the primary windings of the output transformer;

FIG. 5 is a schematic diagram of a single current transformer connected to sense the currents through both primary windings of the output transformer;

FIG. 6 is a set of current waveforms used in describing the operation of FIGS. 4 and 5.

The switch current sensing circuit is illustrated and described as embodied in a pulse width modulated DC to DC push-pull converter which is powered from an unregulated DC source and develops a regulated DC output. The sensing circuit might also be used in a push-pull DC to AC inverter, having an AC output. Accordingly, when the term converter is used in the specification and the claims, it will be understood to include an inverter unless the context requires a more limited meaning.

Figures 1, 2, 3:
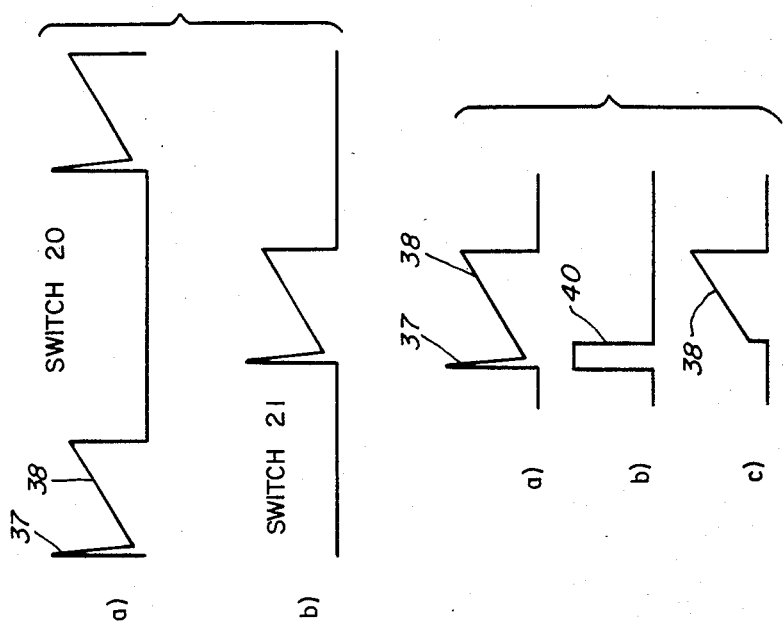
FIG. 1 is a circuit diagram of a prior art converter.
FIG. 2 are switching waveforms for the circuit of FIG. 1.
FIG. 3 are circuit waveforms illustrating prior art gating of the snubber current pulse.

A typical prior art push-pull converter is shown in FIG. 1. Output transformer 15 has primary windings 16, 17 joined at a center tap 18. Power switches 20, 21 conduct alternately to connect the primary windings 16, 17 with a DC source having its positive terminal +V connected with center tap 18 and its negative terminal −V connected with a reference or ground 22. The power switches are here shown as transistors having their collector-emitter circuits connected from the terminals of primary winding 16, 17 to ground. Output transformer 15 has a secondary winding 24 connected with a rectifier 25 having a DC output across which is connected filter capacitor 26 and load 27. The output voltage is connected with a pulse width modulation regulator 30 where it is compared with a reference potential V−REF. The PWM regulator produces driving pulses connected with the base elements of power transistors 20, 21 causing them to conduct alternately.

Switching transistors must be protected from the simultaneous occurrence of a large current and a large voltage. When the switching transistor is turned off, the collector voltage rises before the current through the output transformer winding can reduce to zero. Turn-off snubber circuits 31, 32 are connected in parallel with the collector-emitter circuits of transistors 20, 21. Each turnoff snubber circuit includes a diode 33 connected in parallel with a resistor 34 and in series with capacitor 35. When switching transistor 20 is turned off, the collector voltage starts to rise. This forward-biases diode 33 which conducts the collector current to charge capacitor 35. The rise of collector voltage is delayed and the simultaneous occurrence of a large current through and a large voltage across the switching transistor is avoided. When the switching transistor is again turned on, capacitor 35 discharges through resistor 34 and transistor 20, dissipating the stored energy.

Typical converter switch currents are shown in FIGS. 2a and 2b for the switches 20, 21 respectively. Each switch waveform is of the same character, having an initial pulse 37 due to the near zero impedance of the transformer during inrush of current into the opposite snubber capacitor when going to two-times DC voltage, followed by a ramp 38 made up of the transformer magnetizing current and the load current reflected in the primary winding.

The snubber current pulse 37 exceeds in amplitude the current 38. Accordingly, the switch current waveforms of FIG. 2 cannot be used in a control circuit without masking or otherwise eliminating the effect of the snubber current pulse. This has been done in the past by a gating circuit. The waveforms of FIG. 3 illustrate gating circuit operation. Waveform 3a is the switch current including the snubber current pulse. FIG. 3b shows a gating pulse 40 in synchronism with the snubber current pulse 37. Waveform 3c shows the current waveform 38 from which the snubber current pulse has been removed. The blanking pulse 40 must be synchronized with the occurrence of the snubber current pulse 37 and must have a width that is greater than the width of the snubber current pulse under worst case operating conditions. Moreover, the gating operation can introduce noise into the current signal, requiring filtering to make the signal usable.

The switch current in a converter circuit is sometimes sensed by measuring the voltage across a small resistor connected in series in the switch circuit. The resistor introduces losses and is inefficient at high power levels. Moreover, resistive sensing introduces noise at high switching frequencies because of the inductance of the internal construction of the resistor and the resistor leads.

FIG. 4 illustrates a switch current sensing circuit using two current transformers. Circuit elements described above will be identified by the same reference numerals and will not be described in detail. Current transformer output windings 45, 46 are coupled with the conductors 47, 48, respectively, which in turn connect power switches 20, 21 with primary windings 16, 17 of the output transformer. The current signal waveforms from current transformers 45, 46 are shown in FIGS. 6a and 6b, respectively. The snubber and switch current pulses have much the same waveforms shown in FIG. 2. However, when switch 20 turns on, autotransformer action in the primary winding of the output transformer causes the voltage across snubber circuit 32 to approach two-times the source voltage. The diode of the snubber circuit conducts and the capacitor charges toward this higher voltage value. The resulting current pulse 50 appears in the output of current transformer 46. Similarly, when power switch 21 conducts a current pulse 51 appears in the output of current transformer 45. The pulses 50, 51 occur in synchronism with the slightly greater current pulses flowing in the opposite primary that provides the motive force to cause two-times voltage to appear in the first place.

In accordance with the invention, the current waveforms through conductors 47, 48 are combined with a phase relationship such that the snubber current pulses 37, 50 oppose each other and are suppressed or cancelled. The preferred circuit for accomplishing this is shown in FIG. 5 where the current transformer 54 has an output winding 55 which is inductively coupled with both of the conductors 47, 48 and the conductors which are physically arranged so that the currents through them flow in opposite directions. The simultaneous and opposing pulses 37, 50, 51 are cancelled magnetically. This form of signal cancellation introduces little or no noise.

The signal from current transformer 54, at the terminals of secondary or output winding 55 is shown in FIG. 6c with the current pulses from switch 20 and conductor 47 having a positive sense and the pulse from switch 21 and conductor 48 a negative orientation.

The output of transformer 54 is connected with a full wave diode bridge rectifier 56 and the rectified signal appearing across burden resistor 57 has the waveform shown in FIG. 6d. The current pulses have a negative orientation.

Coupling the current transformer 54 with conductors 47, 48 rather than with the collector connections of switching transistors 20, 21 has an added advantage. The snubber circuits 31, 32 must be packaged as close as physically possible to the switch transistors 20, 21 to minimize inductance in series with the diode and capacitor. Accordingly, it is difficult to use a resistor or current transformer to measure the collector current alone.

Figure 7:
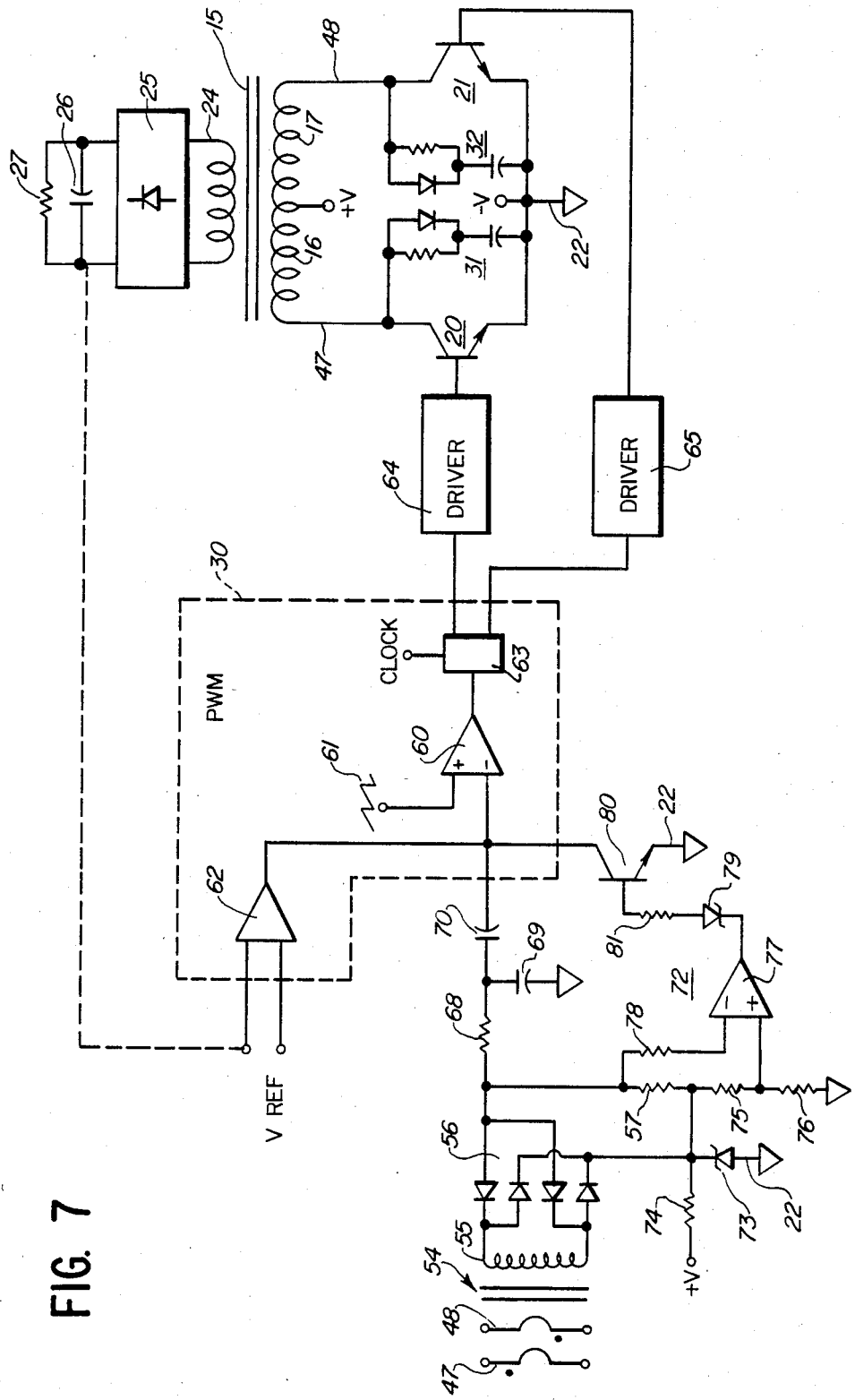
FIG. 7 is a schematic diagram of a converter circuit with current sensing and control of the pulse width modulator, in accordance with the invention.

The switch current signals from current transformer 55 and rectifier 56 may be used in modifying the operation of the pulse width modulator as shown in FIG. 7. Again, circuit elements which have been identified above will be identified with the same reference numerals and will not be described in detail.

The pulse width modulator includes an operational amplifier comparator 60 which has a ramp signal 61 connected with the noninverting input. A voltage error signal from error detector 62 is connected with the inverting input of comparator 60. The error detector compares the output voltage of the converter with a reference voltage V REF. Gate circuit 63, responsive to a clock signal synchronized with ramp 61, directs alternate pulses through driver circuits 64, 65 to the base elements of power transistor switches 20, 21. The amplitude relationship of the error signal to the ramp determines the width of driving pulses to power switches 20, 21 and thus the width of the primary current pulses in the converter output transformer 15.

It is desirable that the current through the two power switches and thus the flux in transformer 15 be balanced to prevent transformer saturation and switch failure. With the switch current sensor of FIG. 7, this is accomplished with the low pass filter of series resistor 68 and shunt capacitor 69 which couple the switch current signal through DC blocking capacitor 70 to the inverting input of PWM comparator 60. The negatively oriented switch current signal pulses, FIG. 6b, are summed with the voltage error signal at the inverting input of comparator 60 and control the turn-off of the power switches 20, 21, balancing the currents therethrough.

A pulse-by-pulse current limiter 72 terminates the driving pulse if a switch current exceeds a limit, thus preventing damage to the switch. A stable positive reference potential is established by Zener diode 73 connected in series with resistor 74 between a DC source +V and ground 22. The negative going output signals of the switch current sensing circuit is referred to the positive reference. A voltage divider of resistors 75, 76 provides a lesser positive reference potential which is connected with the noninverting input of operational amplifier comparator 77. The inverting input of comparator 77 is nominally maintained at the Zener potential through resistors 57, 78 and the comparator output is low. So long as the switch currents are not excessive, the switch current signal amplitudes are less than the difference in potential between the two inputs of comparator 77 and the output of the comparator remains low. Zener diode 79 does not conduct and there is no signal applied to the base element of transistor 80 which has its collector-emitter circuit connected from the inverting input of PWM comparator 60 to ground. Nonconducting transistor 80 has a high impedance and does not affect the operation of the pulse width modulator. If, however, a switch current exceeds the maximum permissible value, the negative switch current signal drives the inverting input of comparator 77 below the positive reference potential at the noninverting input. The output of comparator 77 goes high, Zener diode 79 conducts and a base signal is applied to transistor 80 through resistor 81. Transistor 80 conducts, grounding the noninverting input of PWM comparator 60 and terminating the drive pulse to the power switch. The current limiter circuit acts practically instantaneously, terminating the drive pulse to the power switch and the switch current before damage can occur.

We claim:

1. In a push-pull converter having a DC source, an output transformer with primary windings, a pair of power switches which conduct alternately to connect the power source with the primary windings of the output transformer and a turn-off snubber circuit connected with each of said power switches, the snubber circuits causing a snubber current to flow in both primary windings at a turn-on of each of said switches, each switch being connected by a conductor with an output transformer primary winding, a switch current sensing circuit comprising:

a current transformer having an output winding inductively coupled with each of said conductors which connect the switches and the primary windings of the output transformer, the conductors being physically arranged so that the switch currents through the conductors are 180° out of phase, suppressing the snubber current pulses in the switch current signal developed in the output winding of the current transformer.

2. The push-pull converter of claim 1 having a pulse width modulator control for the power switches and in which the switch current signal from the output winding of said current transformer is connected with and affects the operation of said pulse width modulator control.

3. The push-pull converter of claim 1 including means responsive to said switch current signal providing a flux balance input to said pulse width modulator control.

4. The push-pull converter of claim 2 including means responsive to said switch current signal providing a pulse-by-pulse current limiting input to said pulse width modulator control.

5. The switch current sensing circuit of claim 1 including a full wave rectifier connected with the output winding of said current transformer.

6. The switch current sensing circuit of claim 5 in which said full wave rectifier is a diode bridge circuit.

7. The switch current sensing circuit of claim 1 in which the power switch is a transistor and said turn-off snubber circuit includes a capacitor connected in series with the parallel combination of a resistor and a diode, the snubber circuit being connected in parallel with the collector-emitter circuit of the associated power switch transistor.

8. The switch current sensing circuit of claim 7 including a full wave rectifier connected with the output winding of said current transformer.

9. The push-pull converter of claim 8 having a pulse width modulator for the power switches and means responsive to said switch current signal providing a flux balance input to said pulse width modulator.

10. The push-pull converter of claim 8 having a pulse width modulator for the power switches and means responsive to said switch current signal providing a pulse-by-pulse current limiting input to the pulse width modulator.

* * * * *